(12) United States Patent
Chen et al.

(10) Patent No.: US 10,035,202 B2
(45) Date of Patent: Jul. 31, 2018

(54) PIPE CUTTER

(71) Applicants: Tsan-Lung Chen, Taichung (TW); Yuan-Te Chou, Taichung (TW)

(72) Inventors: Tsan-Lung Chen, Taichung (TW); Yuan-Te Chou, Taichung (TW)

(73) Assignee: TOP GOAL Enterprise Limited, Shanghai (CN)

( * ) Notice: Subject to any disclaimer, the term of this patent is extended or adjusted under 35 U.S.C. 154(b) by 0 days.

(21) Appl. No.: 15/485,196

(22) Filed: Apr. 11, 2017

(65) Prior Publication Data
US 2018/0021863 A1    Jan. 25, 2018

(30) Foreign Application Priority Data

Jul. 20, 2016  (TW) .............................. 105122814 A

(51) Int. Cl.
*B23D 21/08* (2006.01)
(52) U.S. Cl.
CPC .................................... *B23D 21/08* (2013.01)
(58) Field of Classification Search
CPC .............................. B23D 21/08; Y10T 83/104
See application file for complete search history.

(56) References Cited

U.S. PATENT DOCUMENTS

| | | | | |
|---|---|---|---|---|
| 3,013,335 A * | 12/1961 | Kowal | ................... | B23D 21/08 30/102 |
| 3,376,638 A * | 4/1968 | Bjalme | .................. | B23D 21/08 30/102 |
| 3,545,081 A * | 12/1970 | Butler | .................... | B23D 21/08 15/104.03 |
| 4,655,064 A * | 4/1987 | Hoback | ................. | B21D 17/04 72/121 |
| 5,329,797 A * | 7/1994 | Calhoun | ............... | B21D 17/04 72/121 |
| 6,393,700 B1 * | 5/2002 | Babb | ..................... | B23D 21/08 30/101 |
| 6,401,340 B1 * | 6/2002 | King | ...................... | B23D 21/08 30/101 |
| 9,796,029 B2 * | 10/2017 | Williams | ............... | B23D 21/08 |
| 2018/0021863 A1 * | 1/2018 | Chen | ..................... | B23D 21/08 |

FOREIGN PATENT DOCUMENTS

| DE | 198 00 734 B4 * | 5/2007 |
| WO | WO 2014/067290 A1 * | 5/2014 |

* cited by examiner

*Primary Examiner* — Hwei C Payer

(57) ABSTRACT

A pipe cutter includes a body and a cutting wheel unit. The body includes a slot, a transverse slot and a recessed area. The cutting wheel unit includes a shaft, a cutting wheel, a movable member and a resilient member. The shaft is pivotably connected to the transverse slot and includes a flange and an engaging groove. The cutting wheel is received in the slot and is pivotably connected to the shaft. The movable member is movably received in the recessed area and has an engaging portion which is engaged with the engaging groove of the shaft. The resilient member is biased between the recessed area and the movable member so that the shaft is restricted from being disengaging from the transverse slot by the movable member.

8 Claims, 17 Drawing Sheets

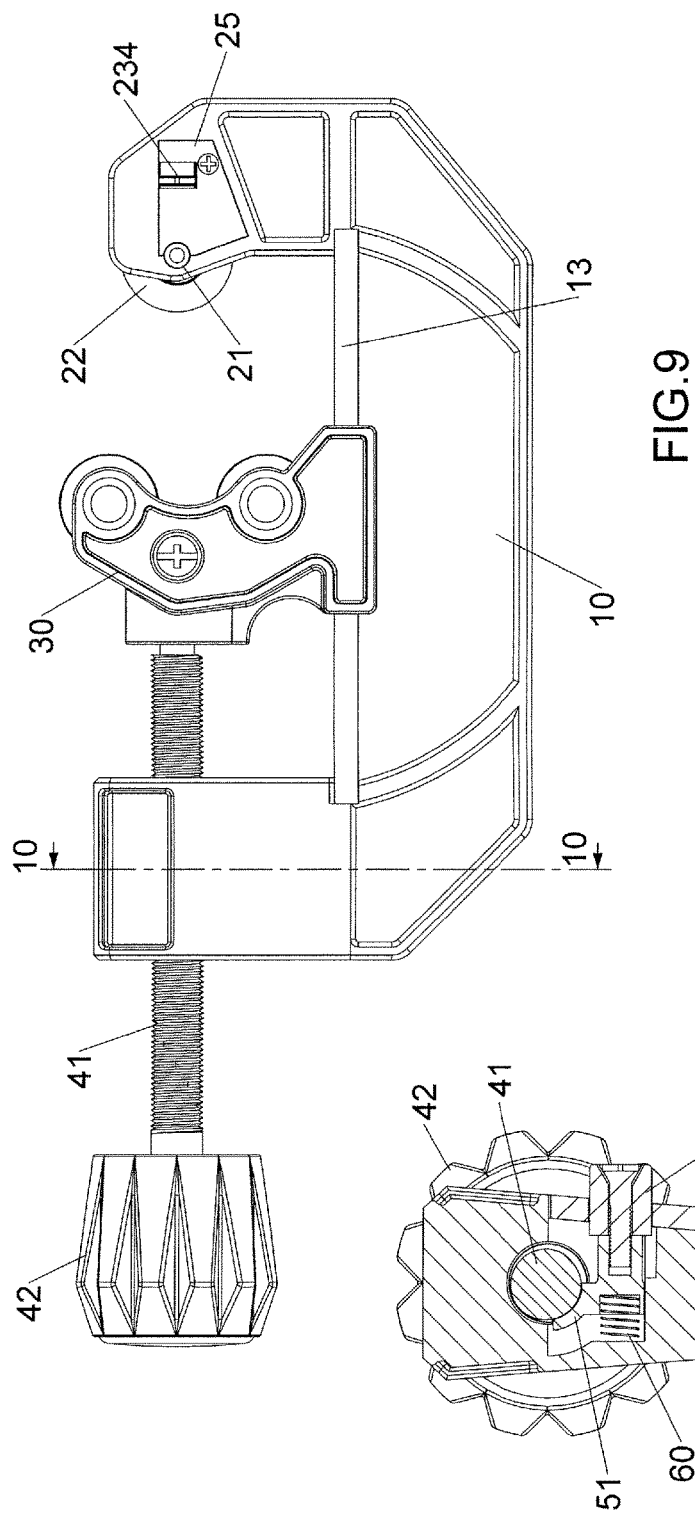

PIPE CUTTER

BACKGROUND OF THE INVENTION

1. Fields of the Invention

The present invention relates to a pipe cutter.

2. Descriptions of Related Art

The conventional pipe cutter known to applicant is disclosed in U.S. Pat. No. 3,145,469 and comprises a C-shaped body with a room and a passage is defined in the body. A pivot pivotably connects a first cutter to the body. A movable member is rotatably and movably inserted in the passage. The movable member has a knob on one end thereof and a head on the other end thereof. A seat is pivotably connected to the body and contacts the head of the movable member. A second cutter is connected to the body and located corresponding to the first cutter. When the movable member rotates in the passage and moves to move the seat in an arc path so as to adjust the distance between the first and second cutters. A button is connected to the body by the pivot and includes a toothed portion which is engaged with the threads on the movable member. A resilient member contacts the body and the button so that the users push the button to compress the resilient member to disengage the toothed portion from the movable member, such that the movable member is linearly movable without being restricted by the toothed portion. However, when the users want to replace the first cutter, the users have to use tools to remove the pivot away from the body so as to replace the first cutter. This is not convenient for the users.

The present invention intends to provide a pipe cutter which eliminates the shortcomings mentioned above.

SUMMARY OF THE INVENTION

The present invention relates to a pipe cutter and comprises a body and a cutting wheel unit. The body includes a slot, a transverse slot and a recessed area. The cutting wheel unit includes a shaft, a cutting wheel, a movable member and a resilient member. The shaft is pivotably connected to the transverse slot and includes a flange and an engaging groove. The cutting wheel is received in the slot and is pivotably connected to the shaft. The movable member is movably received in the recessed area and has an engaging portion which is engaged with the engaging groove of the shaft. The resilient member is biased between the recessed area and the movable member so that the shaft is restricted from being disengaging from the transverse slot by the movable member.

The primary object of the present invention is to provide a pipe cutter wherein the engaging portion of the movable member is disengaged from the engaging groove of the shaft by shifting the lever of the movable member, so that the shaft is able to be removed from the body, and the cutting wheel can be easily and conveniently replaced.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 9 is a side view of the pipe cutter of the present invention;

FIG. 10 is a cross sectional view, taken along line 10-10 in FIG. 9;

DETAILED DESCRIPTION OF THE PREFERRED EMBODIMENT

Figure 1:
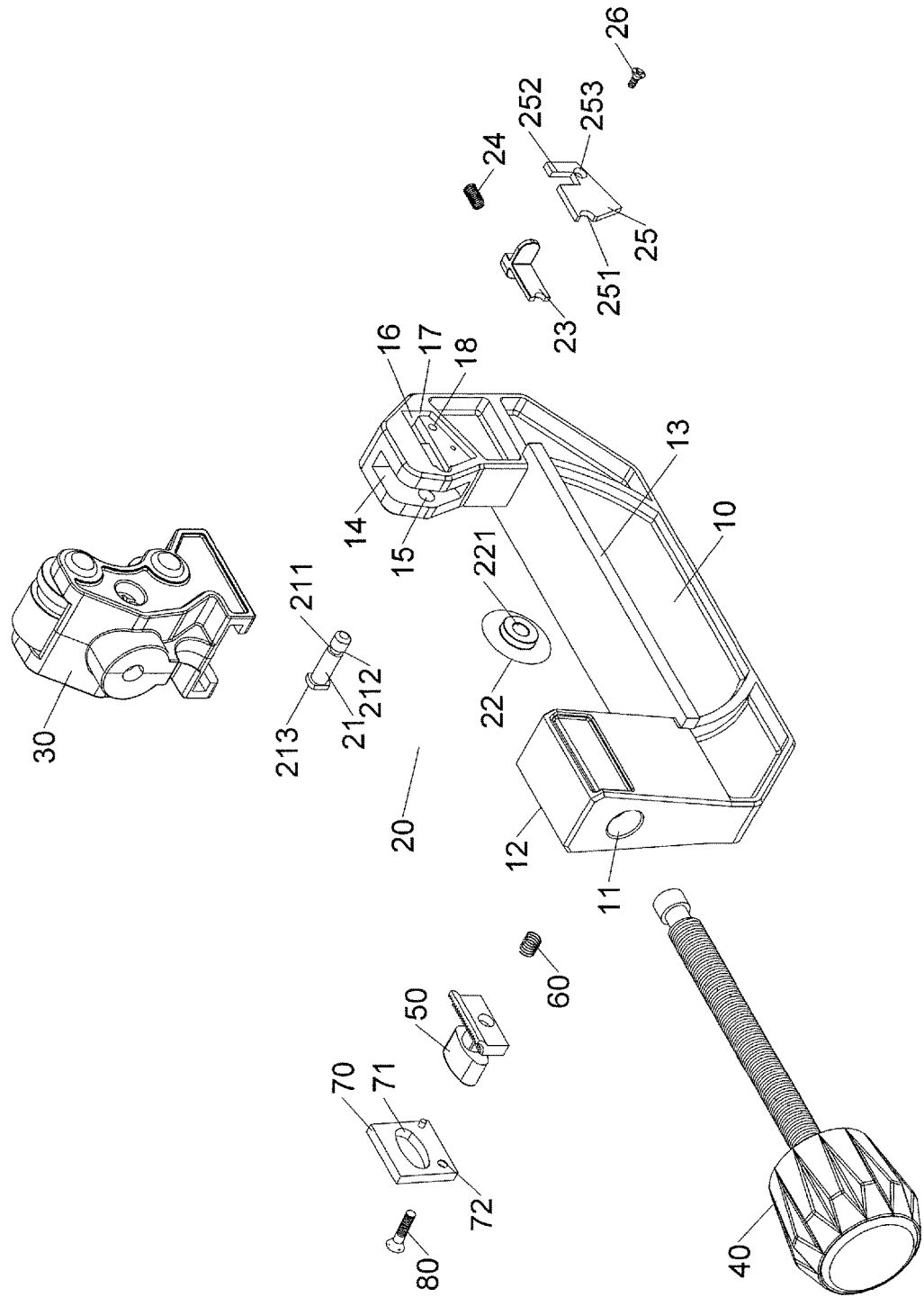
FIG. 1 is an exploded view of the pipe cutter of the present invention.
Figure 2:
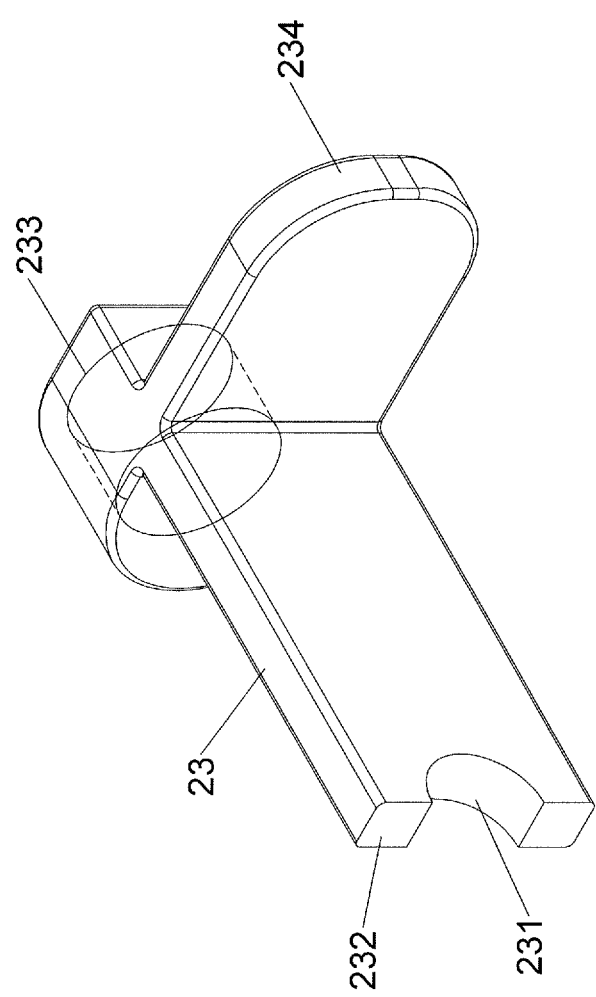
FIG. 2 is a perspective view to show the movable member of the pipe cutter of the present invention.
Figure 3:
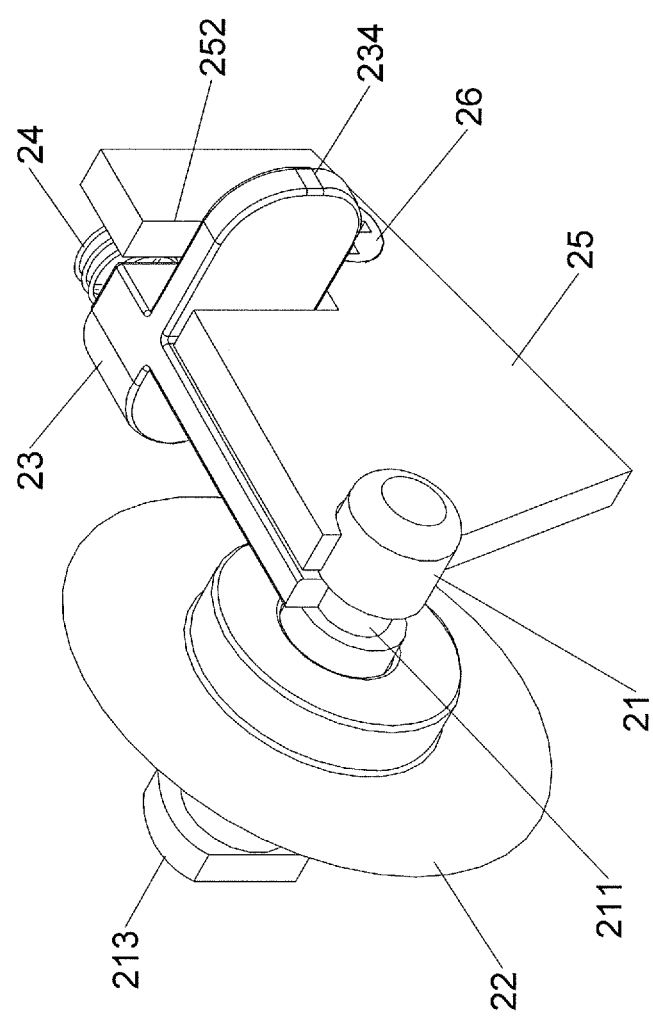
FIG. 3 is a perspective view to show the cutting wheel unit of the pipe cutter of the present invention.
Figure 4:
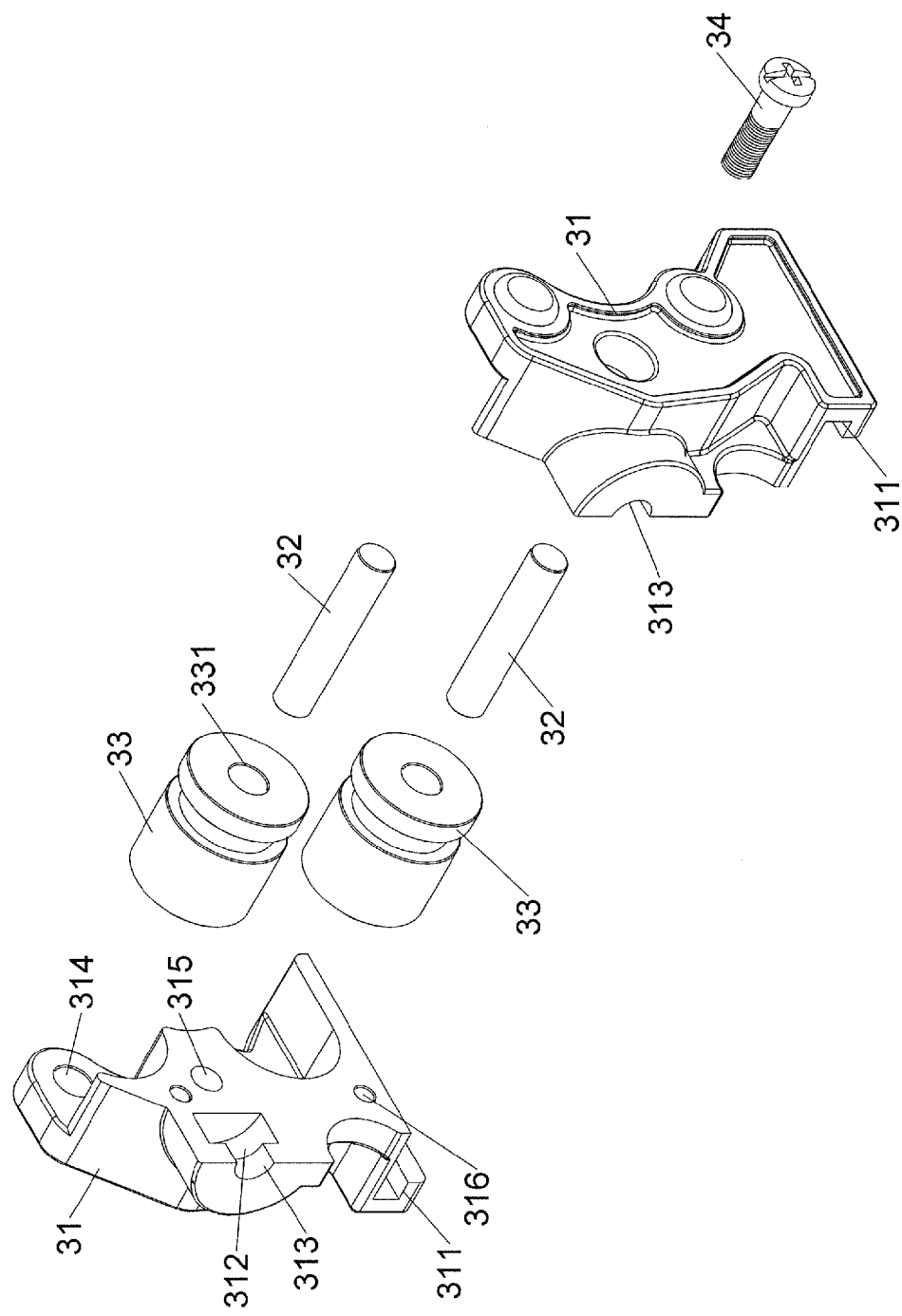
FIG. 4 is an exploded view to show the slidable unit of the pipe cutter of the present invention.
Figure 5:
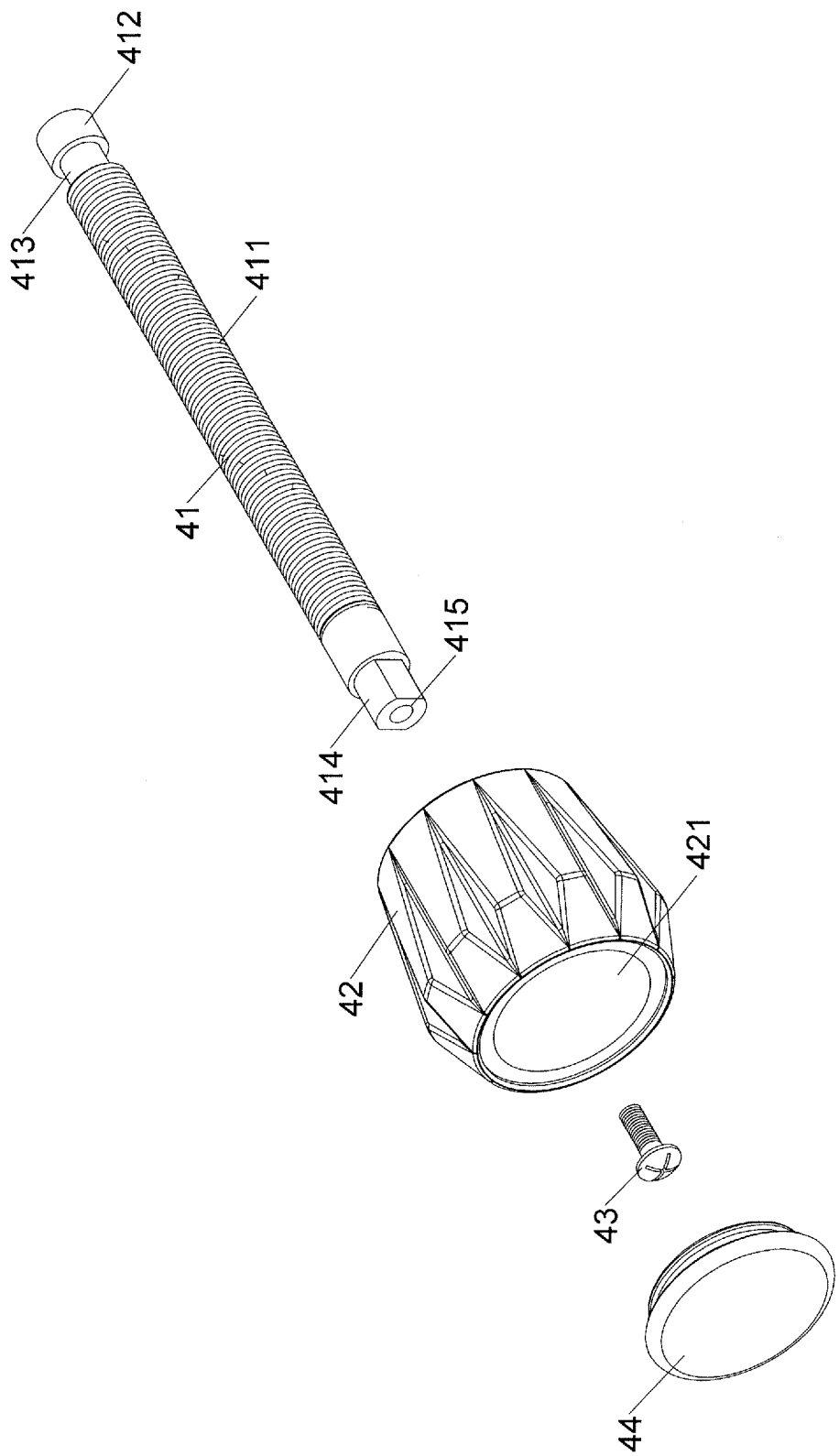
FIG. 5 is an exploded view to show the threaded rod unit of the pipe cutter of the present invention.
Figure 6:
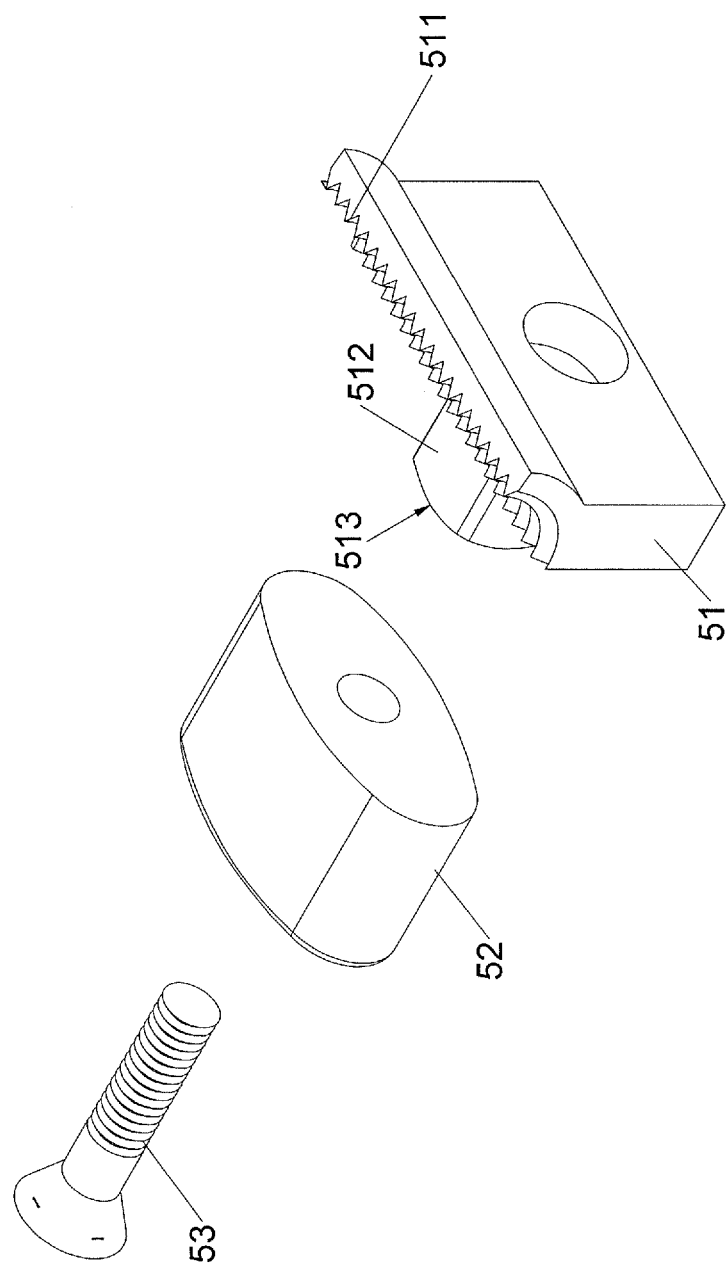
FIG. 6 is an exploded view to show the control unit of the pipe cutter of the present invention.
Figure 7:
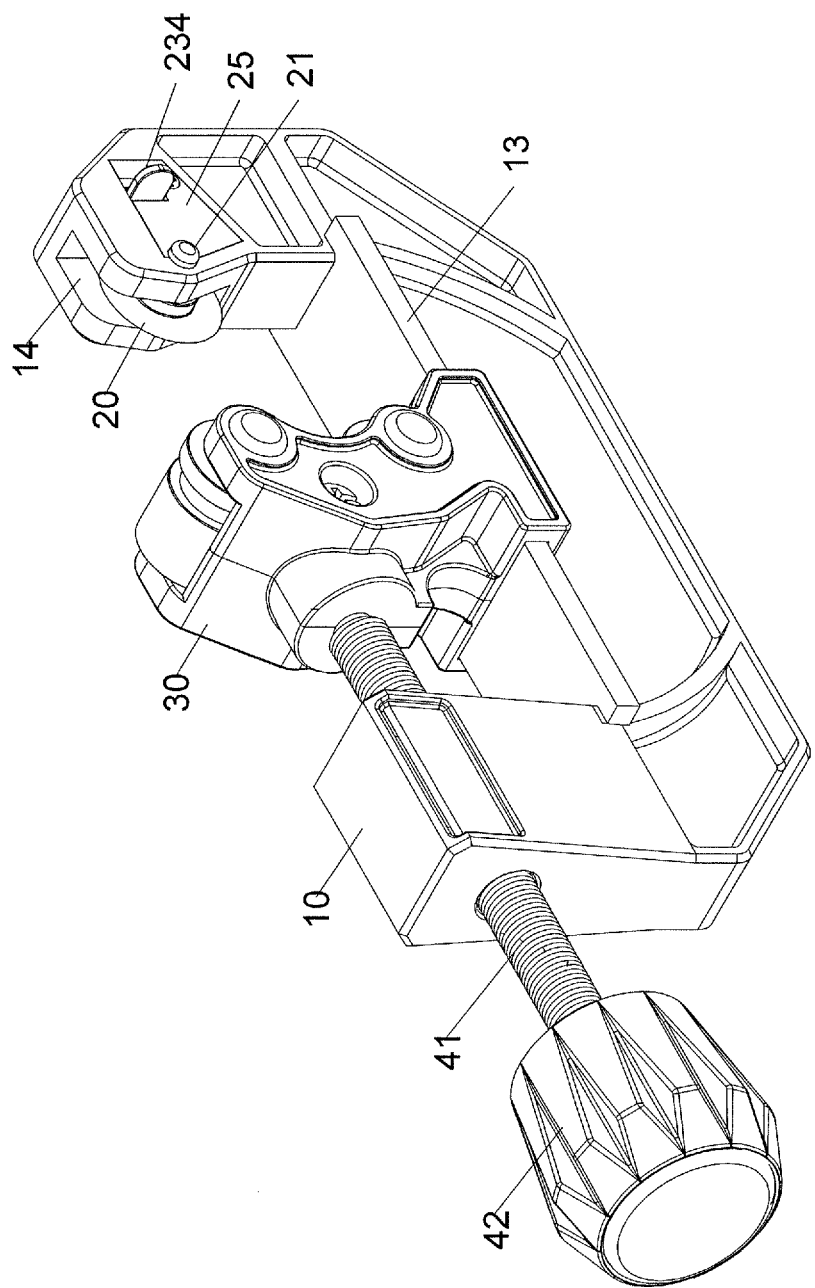
FIG. 7 is a perspective view to show the pipe cutter of the present invention.
Figure 8:
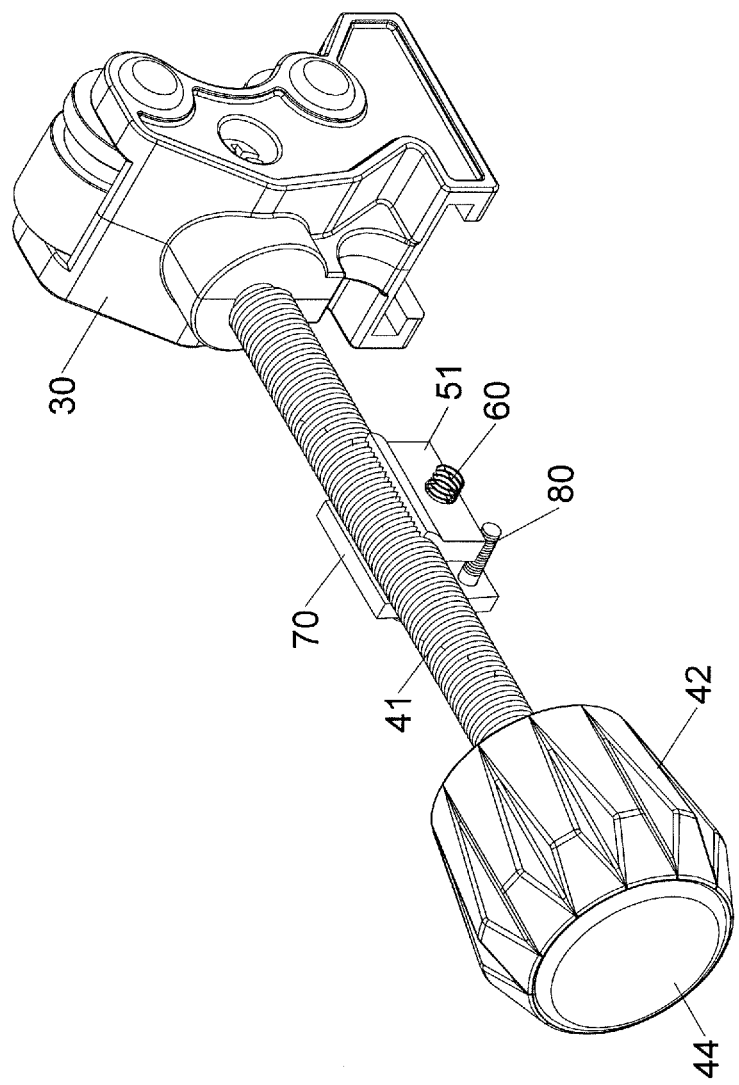
FIG. 8 is a perspective view to show a portion of the pipe cutter of the present invention.

Referring to FIGS. 1 to 8, the pipe cutter of the present invention comprises a C-shaped body 10, a cutting wheel unit 20, a slidable unit 30, a threaded rod unit 40, a control unit 50, a resilient member 60, a cover 70 and a fixing member 80.

The body 10 includes a passage 11 and a transverse slot 12 defined in the first end thereof, wherein the transverse slot 12 communicates with the passage 11. An axial slot 14 is defined axially in the second end of the body 10 and located corresponding to the passage 11. A transverse hole 15 is defined through the wall of the slot 14. A rail 13 is connected between the first and second ends of the body 10. A recessed area 16 is defined in one side of the first end of the body 10 and communicates with the transverse hole 15. A locking hole 18 is defined in the inner bottom of the recessed area 16. A cap reception recess 17 is defined in the opening of the recessed area 16.

The cutting wheel unit 20 comprises a shaft 21, a cutting wheel 22, a movable member 23, a resilient member 24, a cap 25 and a pin 26. The shaft 21 pivotably extends through the transverse hole 15 and has a flange 213 formed on the first end thereof. The second end of the shaft 21 extends beyond the recessed area 16. An engaging groove 211 defined in the second end close to the distal end 212 of the shaft 21. The cutting wheel 22 is located in the axial slot 14 and has an axial protrusion 221 through which the shaft 21 extends. The axial protrusion 221 is located between the engaging groove 211 and the flange 213. The movable member 23 is linearly movably received in the recessed area 16. The movable member 23 has an engaging portion 231 defined in the first end thereof, and a receiving portion 233 is defined in the second end thereof. The inner surface of the engaging portion 231 is engaged with the engaging groove 211. The engaging portion 231 is located between two extensions 232 which laterally contact inner sides of the engaging groove 211. A lever 234 extends laterally from the second end thereof, and extends beyond the body 10. The resilient member 24 is received in the receiving portion 233 and biased between the inner end of the recessed area 16 and the movable member 23 so that the movable member 23 is restricted from being disengaging from the transverse hole 15. When the lever 234 is shifted to move the movable member 23 to compress the resilient member 24, the inner surface of the engaging portion 231 is disengaged from the engaging groove 211. The shaft 21 is no longer restricted by the movable member 23 so that the shaft 21 is able to be removed from the body 10, and the cutting wheel 22 can be replaced with a new one. The cap 25 is engaged with the cap reception recess 17 and has a notch 251 with which the shaft 21 is engaged. The cap 25 has a recess 252 and an aperture 253, and the lever 234 extends through the recess 252. The aperture 253 is located corresponding to the locking hole 18. The pin 26 extends through the aperture 253 and is connected to the locking hole 18 to fix the cap 25 to the cap reception recess 17.

The slidable unit 30 comprises two seats 31, two axles 32, two rollers 33 and a locking member 34. The two seats 31 are connected to each other. Each seat 31 has a sliding slot 311 and the rail 13 is engaged with the sliding slots 311. The two seats 31 are slidable along the rail 13. Each of the seats 31 has a first recess 312 and a second recess 313 in one side thereof. The first and second recesses 312, 313 share a common axis. The two respective first recesses 312 of the two seats 31 form a first circular recess, and the two respective second recesses 313 of the two seats 31 form a second circular recess when the two seats 31 are connected to each other. Each seat 31 includes two pivotal portions 314 and a connection portion 315. Each axle 32 extends through an axial hole 331 of each of the rollers 33, and two ends of each of the axles 32 are pivotably connected to the two respective pivotal portions 314 of the two seats 31 such that the two rollers 33 are located corresponding to the cutting wheel 22. The locking member 34 extends through the two respective connection portions 315 of the two seats 31 to fix the two seats 31. Each of the seats 31 has two engaging portions 316, and the engaging portions 316 of the two seats 31 are engaged with each other by way of ridge-to-recess when the two seats 31 are connected to each other.

The threaded rod unit 40 is connected to the body 10 and the slidable unit 30, and comprises a threaded rod 41, a knob 42 and a connector 43. The knob 42 is connected to the first end of the threaded rod 41 which has threads defined in a shank 411 thereof. The shank 411 rotatably and movable extends through the passage 11 when rotating the knob 42. The threaded rod 41 has a head 412 on the second end thereof. A neck 413 is defined in the shank 411 and located beside the head 412. The head 412 is located in the first recesses 312, and the neck 413 is located in the second recesses 313. The threaded rod 40 further includes an insertion 414 extending from the first end thereof and a connection hole 415 is defined in the distal end of the insertion 414. The connector 43 extends through the knob 42 and is connected to the connection hole 415 to connect the knob 42 to the threaded rod 41. The knob 42 has a room 421 defined in the distal end thereof, and the cutting wheel 22 is located in the room 421. An end piece 44 seals the room 421. When rotating the knob 42, the threaded rod 41 is rotatable and movable in the passage 11. When the shaft 21 is removed from the transverse hole 15, the cutting wheel 22 is connected to the shaft 21.

The control unit 50 is connected to the body 10 and the threaded rod unit 40, and has a controller 51, a button 52 and a bolt 53. The controller 51 is located on one side of the threaded rod 41 and received in the transverse slot 12. The controller 51 has a toothed portion 511 which is engaged with the threads of the shank 411 of the threaded rod 41. The controller 51 and the toothed portion 511 have the same length. The axis of the toothed portion 511 is parallel to the axis of the threaded rod 41. The controller 51 is restricted from disengaging from the transverse slot 12 by the threaded rod 41. The controller 51 has a protrusion 512, and the protrusion 512 and the toothed portion 511 are located on the same side of the controller 51. The protrusion 512 has a threaded hole 513. The button 52 is connected to the controller 51 and located in the transverse slot 12. The button 52 partially extends beyond the body 10. The button 52 contacts the protrusion 512. The bolt 53 extends through the button 52 and is threadedly connected to the threaded hole 513 of the controller 51 to connect the controller 51 to the button 52.

The resilient member 60 is received in the transverse slot 12 and biased between an inside of the transverse slot 12 and the controller 51 to engage the toothed portion 511 with the shank 411. When the button 52 is pushed, the controller 51 moves inward and compresses the resilient member 60 to disengage the toothed portion 511 from the shank 411.

The cover 70 is engaged with an opening of the transverse slot 12 and includes an oval hole 71. The button 52 extends through the oval hole 71. The cover 70 includes a circular hole 72 at one of the corners thereof. The fixing member 80 extends through the circular hole 72 and is connected to an inside of the transverse slot 12 to fix the cover 70 to the opening of the transverse slot 12.

Figure 11:
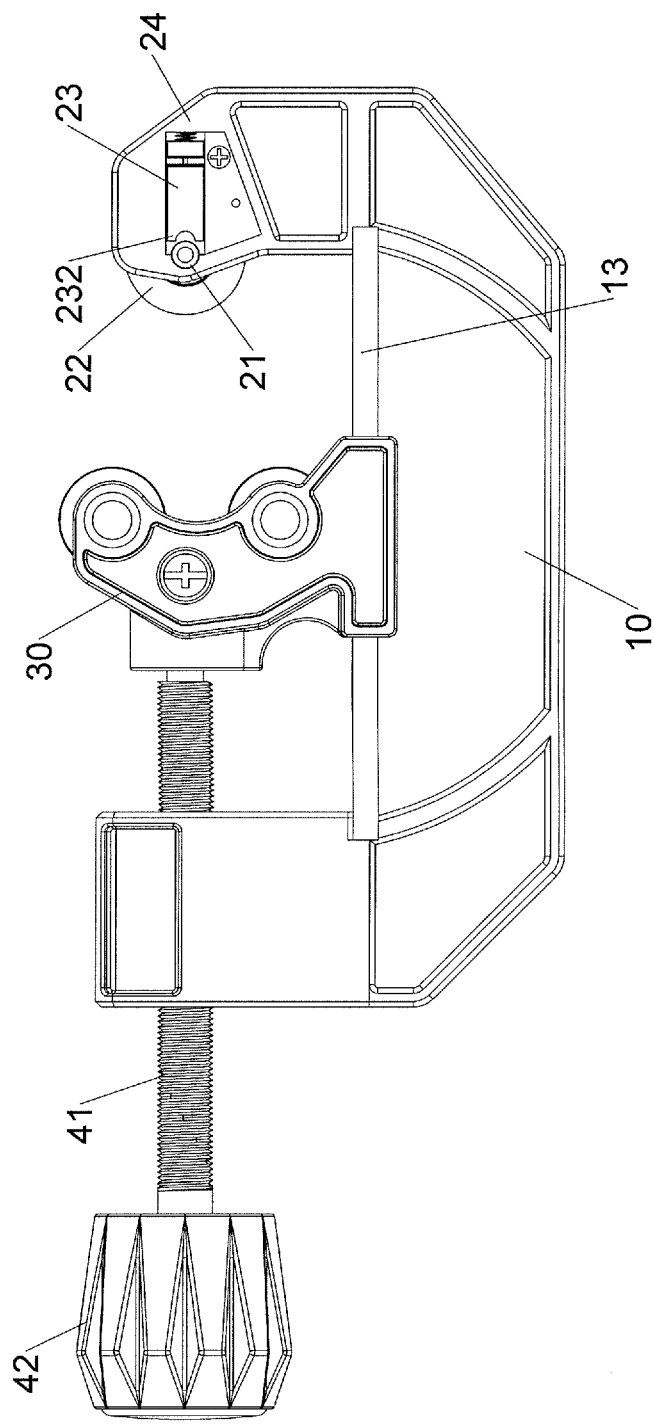
FIG. 11 shows the second operative status of a portion of the pipe cutter of the present invention.
Figure 12:
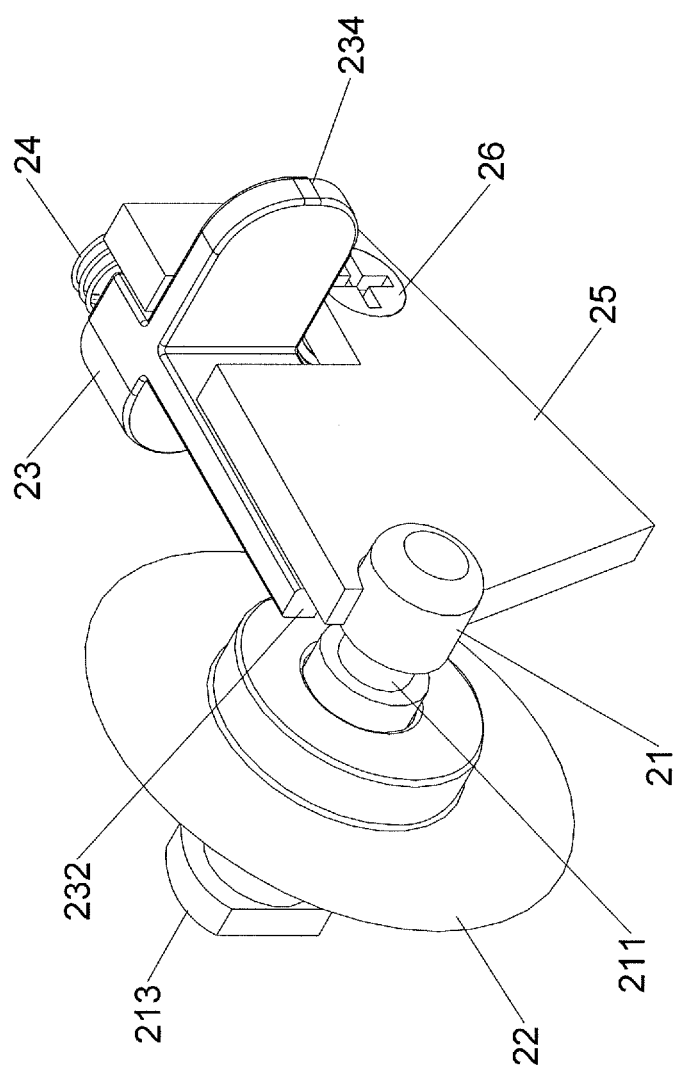
FIG. 12 is a perspective view to show the second operative status of a portion of the pipe cutter of the present invention.
Figure 13:
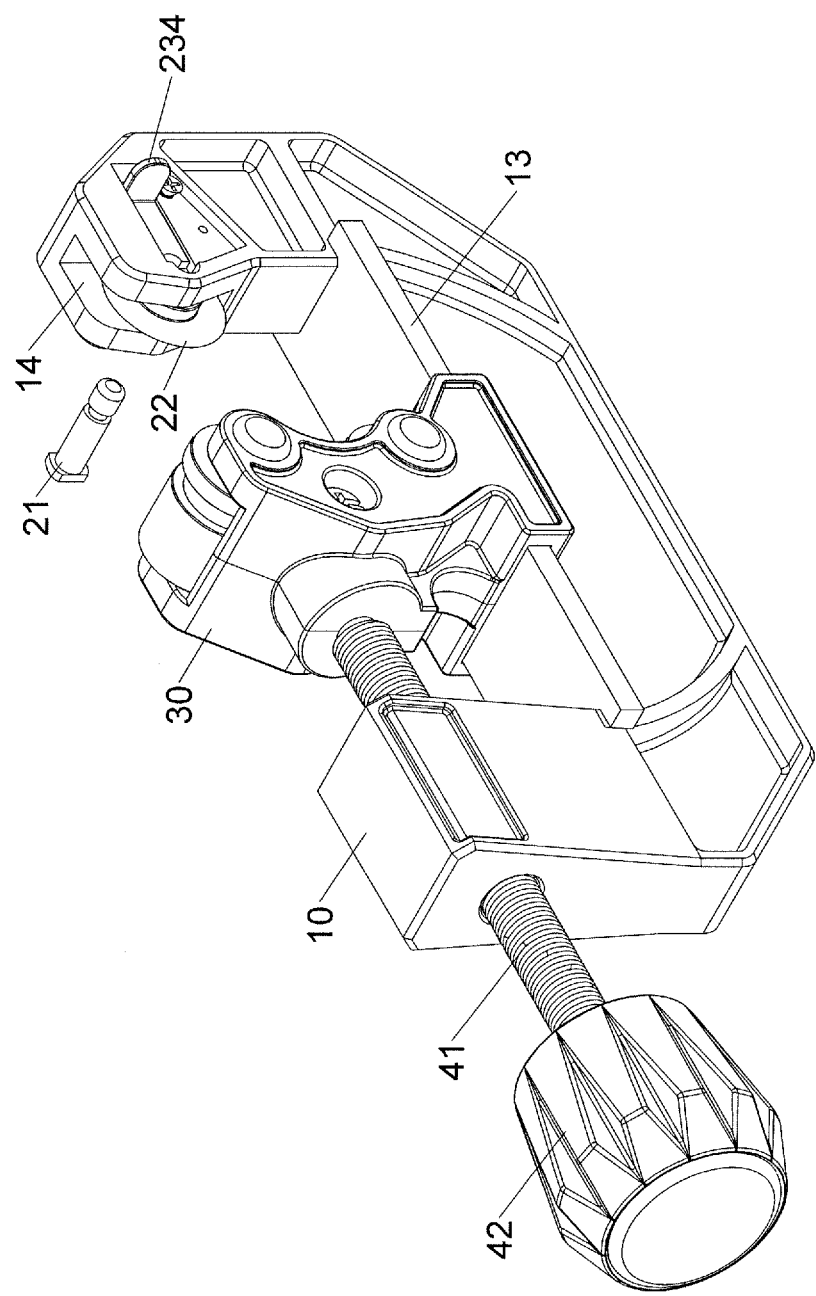
FIG. 13 is a perspective view to show the third operative status of a portion of the pipe cutter of the present invention.
Figure 14:
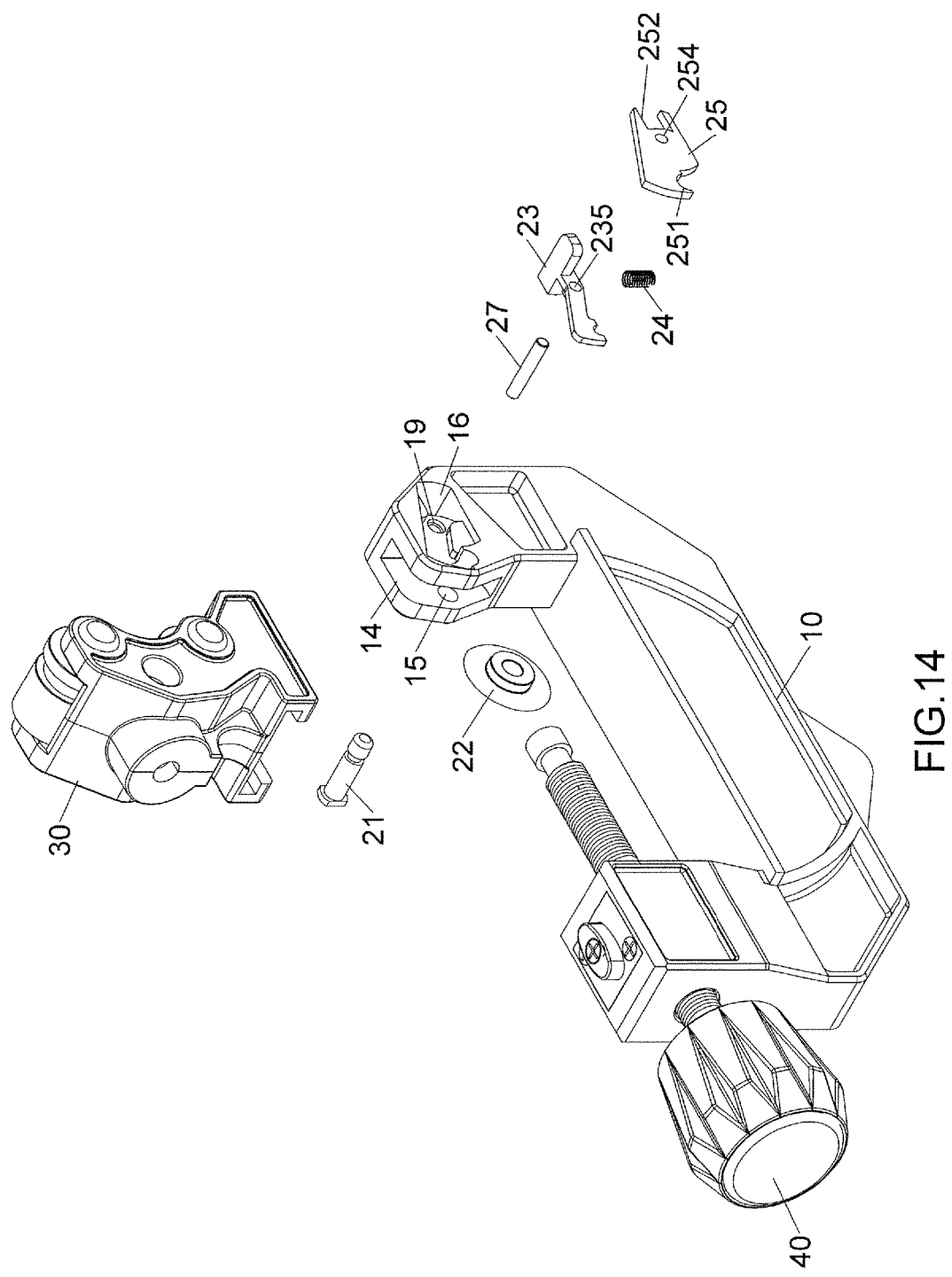
FIG. 14 is an exploded view of the second embodiment of the pipe cutter of the present invention.
Figure 15:
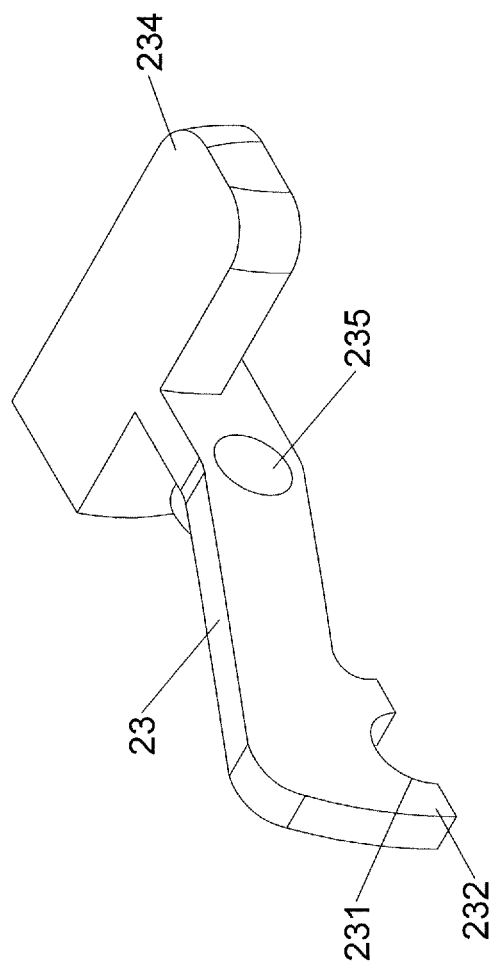
FIG. 15 is a perspective view to show the movable member of the second embodiment of the pipe cutter of the present invention.
Figure 16:
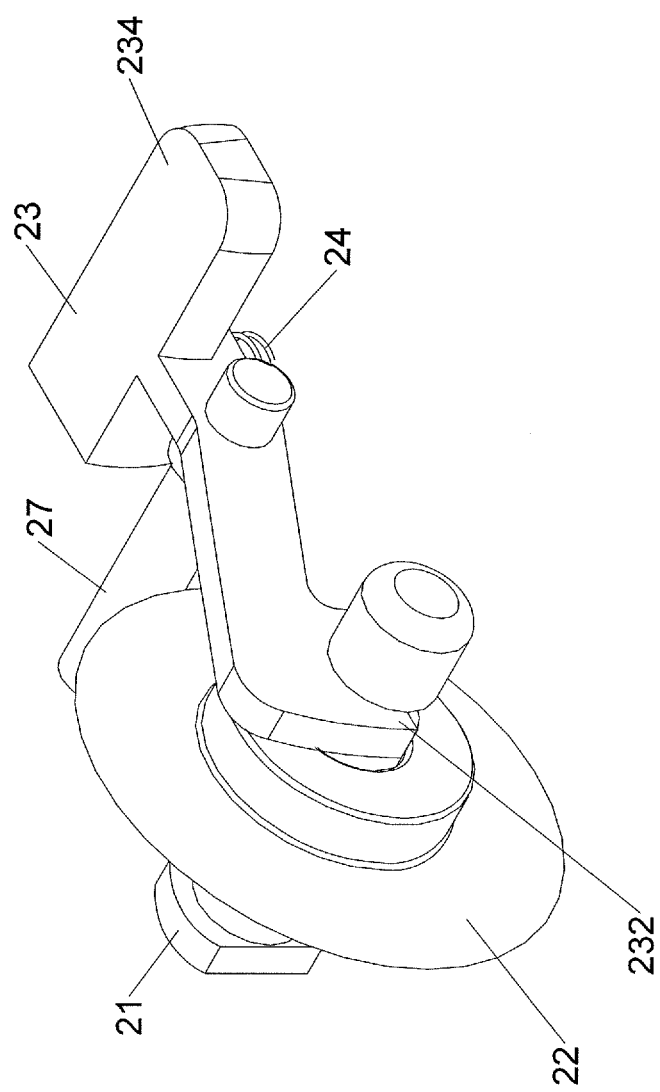
FIG. 16 is a perspective view to show the cutting wheel unit of the second embodiment of the pipe cutter of the present invention.
Figure 17:
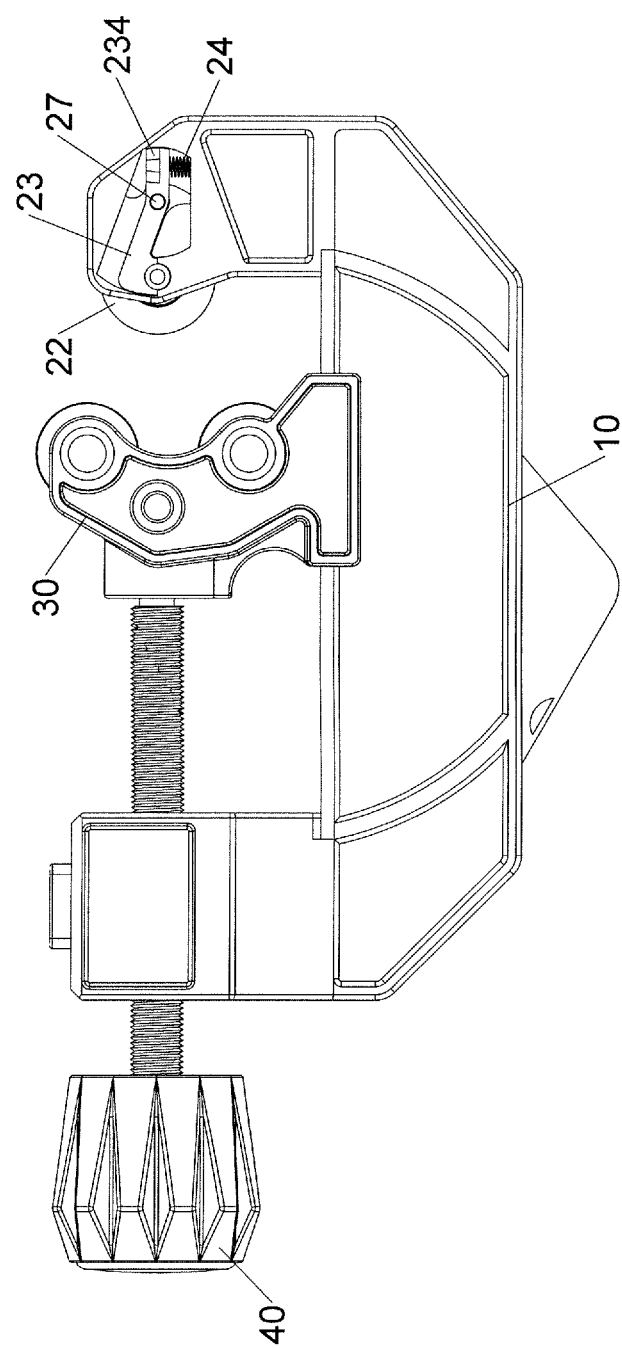
FIG. 17 shows the side view of the second embodiment of the pipe cutter of the present invention.

As shown in FIGS. 11 to 13, when the lever 234 is shifted to move the movable member 23 to compress the resilient member 24, the inner surface of the engaging portion 231 is disengaged from the engaging groove 211. The shaft 21 is no longer restricted by the movable member 23 so that the shaft 21 is able to be removed from the body 10, and the cutting wheel 22 can be replaced with a new one.

As shown in FIGS. 14 to 17, the recessed area 16 has a circular pin hole 19. The movable member 23 has a circular hole 235. The recess 252 is located on one side of the cap 25. The cap 25 has a circular pivotal hole 254 which is located corresponding to the pin hole 19 and the circular hole 235. A pivot 27 extends through the pin hole 19, the circular hole 235 and the pivotal hole 254 to pivotably connect the movable member 23 to the pivot 27.

Figure 18:
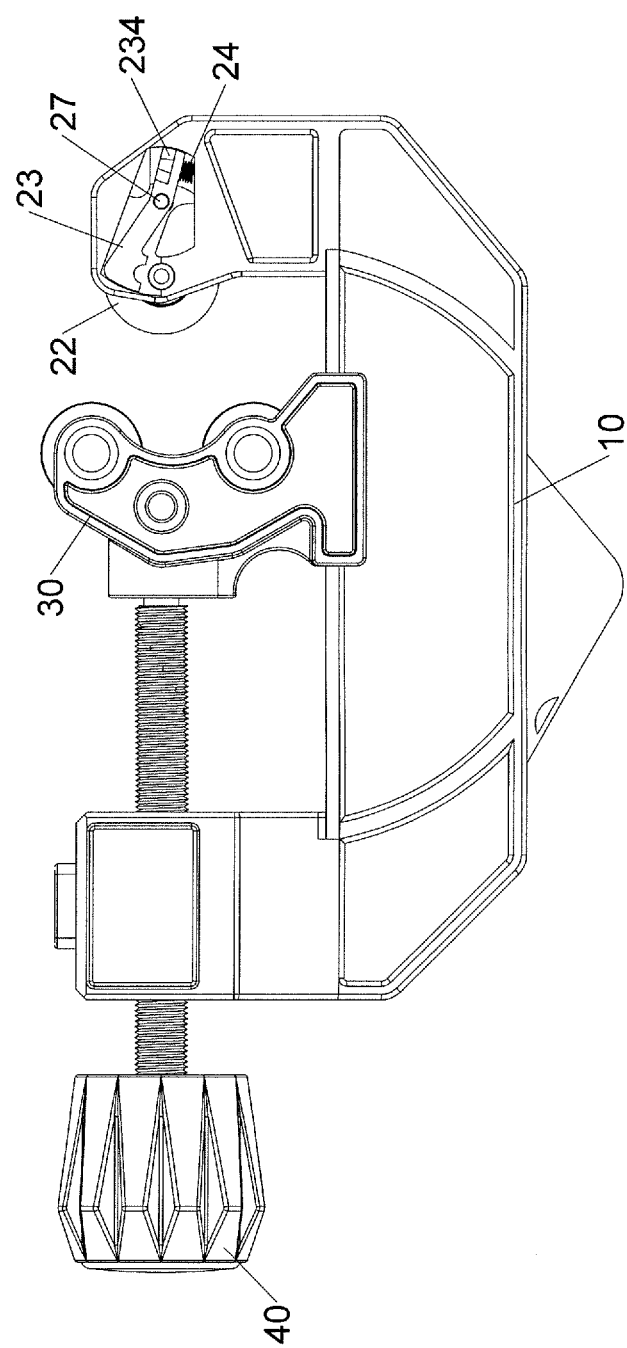
FIG. 18 shows a side view of another operative status of the second embodiment of the pipe cutter of the present invention.

FIG. 18 shows another operative status of the present invention. It is noted that the movable member 23 moves linearly in FIG. 1, and the movable member 23 moves along an arc path in FIG. 14. When the lever 234 is shifted downward to move the movable member 23 to compress the resilient member 24, the inner surface of the engaging portion 231 and the extensions 232 are respectively disengaged from the engaging groove 211 and the distal end 212. The shaft 21 is no longer restricted by the movable member 23 so that the shaft 21 is able to be removed from the body 10.

The advantages are that the shaft 21 can be easily removed from the body 10 by shifting the lever 234, a new cutting wheel 22 can be replaced.

The room 421 of the knob 42 is able to receive multiple cutting wheels 22 so that the users can conveniently replace new cutting wheels 22.

The resilient member 24 is received in the receiving portion 233 of the movable member 23, and the resilient member 24 is biased between the movable member 23 and the inside of the recessed area 16. The shaft 21 is restricted by the movable member 23 and does not disengaging from the body 10 and the cutting wheel unit 20.

While we have shown and described the embodiment in accordance with the present invention, it should be clear to those skilled in the art that further embodiments may be made without departing from the scope of the present invention.

What is claimed is:

1. A pipe cutter comprising:

a body having a passage and a transverse slot defined in a first end thereof, the transverse slot communicating with the passage, an axial slot defined axially in a second end of the body and located corresponding to the passage, a transverse hole defined through a wall of the slot, a rail connected between the first and second ends of the body, a recessed area defined in a side of the second end of the body and communicating with the transverse hole, a locking hole defined in an inner bottom of the recessed area, a cap reception recess defined in an opening of the recessed area;

a cutting wheel unit having a shaft, a cutting wheel, a movable member, a first resilient member, a cap and a pin, the shaft pivotably extending through the transverse hole and having a flange formed on a first end thereof, an engaging groove defined in a second end of the shaft, the cutting wheel located in the axial slot and having an axial protrusion through which the shaft extends, the axial protrusion located between the engaging groove and the flange, the movable member movably received in the recessed area, the movable member having an engaging portion defined in a first end thereof, and a receiving portion defined in a second end thereof, an inner surface of the engaging portion engaged with the engaging groove, a lever extending laterally from a second end thereof, the lever extending beyond the body, the first resilient member received in the receiving portion and being biased between an inner end of the recessed area and the movable member so that the movable member is restricted from being disengaging from the transverse hole, when the lever is pulled to move the movable member to compress the first resilient member, the inner surface of the engaging portion is disengaged from the engaging groove, the cap engaged with the cap reception recess and having a notch with which the shaft is engaged, the cap having a recess and an aperture, the lever extending through the recess, the aperture located corresponding to the locking hole, the pin extending through the aperture and connected to the locking hole to fix the cap to the cap reception recess;

a slidable unit having two seats, two axles, two rollers and a locking member, each seat having a sliding slot, two pivotal portions and a connection portion, the rail slidably engaged with the sliding slots, each axle extending through an axial hole of each of the rollers, two ends of each of the axles pivotably connected to the two respective pivotal portions of the two seats such that the two rollers are located corresponding to the cutting wheel, the locking member extending through the two respective connection portions of the two seats to fix the two seats;

a threaded rod unit having a threaded rod, a knob and a connector, the knob connected to a first end of the threaded rod which has threads defined in a shank thereof, the shank is rotatably and movable extending through the passage when rotating the knob;

a control unit having a controller, a button and a bolt, the controller located on one side of the threaded rod and received in the transverse slot, the controller having a toothed portion which is engaged with the threads of the shank of the threaded rod, an axis of the toothed portion being parallel to an axis of the threaded rod, the controller being restricted from disengaging from the transverse slot by the threaded rod, the controller having a protrusion, the protrusion and the toothed portion located on the same side of the controller, the protrusion having a threaded hole, the button connected to the controller and located in the transverse slot, the button partially extending beyond the body, the button contacting the protrusion, the bolt extending through the button and threadedly connected to the threaded hole of the controller to connect the controller to the button, and a second resilient member received in the transverse slot and biased between an inside of the transverse slot and the controller to engage the toothed portion with the shank, when the button is pushed, the controller moves inward and compresses the second resilient member to disengage the toothed portion from the shank.

2. The pipe cutter as claimed in claim 1, wherein the movable member linearly movable in the recessed area and press the first resilient member when the lever is shifted.

3. The pipe cutter as claimed in claim 1, wherein each of the seats has a first recess and a second recess in one side thereof, the first and second recesses share a common axis, the two respective first recesses of the two seats form a first circular recess, and the two respective second recesses of the two seats form a second circular recess when the two seats are connected to each other, the threaded rod has a head on a second end thereof, a neck is defined in the shank and located beside the head, the head is located in the first recesses, the neck is located in the second recesses.

4. The pipe cutter as claimed in claim 1, wherein each of the seats has two engaging portions, the engaging portions of the two seats are engaged with each other by way of ridge-to-recess when the two seats are connected to each other.

5. The pipe cutter as claimed in claim 1, wherein a cover is engaged with an opening of the transverse slot and includes an oval hole, the button extends through the oval hole, the cover includes a circular hole at a corner thereof, a fixing member extends through the circular hole and is connected to an inside of the transverse slot to fix the cover to the opening of the transverse slot.

6. The pipe cutter as claimed in claim 1, wherein the recessed area has a circular pin hole, the movable member has a circular hole, a pivot extends through the pin hole and the circular hole to pivotably connect the movable member to the pivot.

7. The pipe cutter as claimed in claim 1, wherein the recessed area has a circular pin hole, the movable member has a circular hole, the recess is located on one side of the cap, the cap has a circular pivotal hole which is located corresponding to the pin hole and the circular hole, a pivot extends through the pin hole, the circular hole and the pivotal hole to pivotably connect the movable member to the pivot.

8. The pipe cutter as claimed in claim 1, wherein the knob has a room defined in a distal end thereof, extra cutting wheels are located in the room, an end piece seals the room.

* * * * *